United States Patent
Fukamachi et al.

(10) Patent No.: US 6,357,666 B1
(45) Date of Patent: Mar. 19, 2002

(54) FITTING CONSTRUCTION OF THE THERMOSTAT

(75) Inventors: Masatoshi Fukamachi, Wako; Takahiro Iwaki; Masahiro Aburakawa, both of Kiyose, all of (JP)

(73) Assignees: Honda Giken Kogyo Kabushiki Kaisha; Nippon Thermostat Co., Ltd., both of Tokyo (JP)

( * ) Notice: Subject to any disclaimer, the term of this patent is extended or adjusted under 35 U.S.C. 154(b) by 0 days.

(21) Appl. No.: 09/492,447

(22) Filed: Jan. 27, 2000

(30) Foreign Application Priority Data

Jan. 27, 1999 (JP) .......................................... 11-017923

(51) Int. Cl.[7] .................................................. F01P 7/16
(52) U.S. Cl. ................................ 236/34.5; 137/315.11; 137/454.6
(58) Field of Search ............. 236/34, 34.5; 137/315.11, 137/454.2, 454.6

(56) References Cited

U.S. PATENT DOCUMENTS

| | | | |
|---|---|---|---|
| 3,168,900 A | * 2/1965 | Hansen et al. | ............ 137/454.6 |
| 4,245,781 A | * 1/1981 | Sliger | ........................ 236/34.5 |
| 4,288,033 A | * 9/1981 | Wisyanski | ................. 236/34.5 |
| 4,605,036 A | * 8/1986 | Smith et al. | ............. 137/454.6 |
| 5,123,591 A | * 6/1992 | Reynolds | ................. 137/454.2 |
| 5,881,757 A | * 3/1999 | Kuster et al. | ............ 137/454.2 |
| 6,073,647 A | * 6/2000 | Cook et al. | .............. 137/454.6 |

* cited by examiner

Primary Examiner—William E. Tapolcai
(74) Attorney, Agent, or Firm—Oblon, Spivak, McClelland, Maier & Neustadt, P.C.

(57) ABSTRACT

A fitting construction of the thermostat 1, having a valve body 12 which actuates by the function of a piston portion 11, 15, 15a, 16 and a spring portion 6 depending upon a temperature change in the cooling fluid to cross said fluid channel FA, and which blocks or communicates the fluid channel by the movement is disclosed. The construction has a valve body 17 possessing an insert hole 5a into which the valve body 17 is inserted, an alignment groove 2b formed along the direction of the insertion of the valve body 17, projection 17g is placed on the circumference surface of the valve body 17, which is engaged with the alignment groove 2b, and which can slide along the alignment groove 2b, and a cover 19 which is screwed from the hole opening 2a onto the insert hole 5a, and which pushes and supports the valve body 17 at the end thereof. By having such a construction, there is no need for enlarging the diameter of the pipe, making it possible to moderate the restrictions of the thermostat placement. The engagement of the alignment groove with the projection makes it easy to carry out alignment, leading to the improvement in the workability of fitting the thermostat.

7 Claims, 8 Drawing Sheets

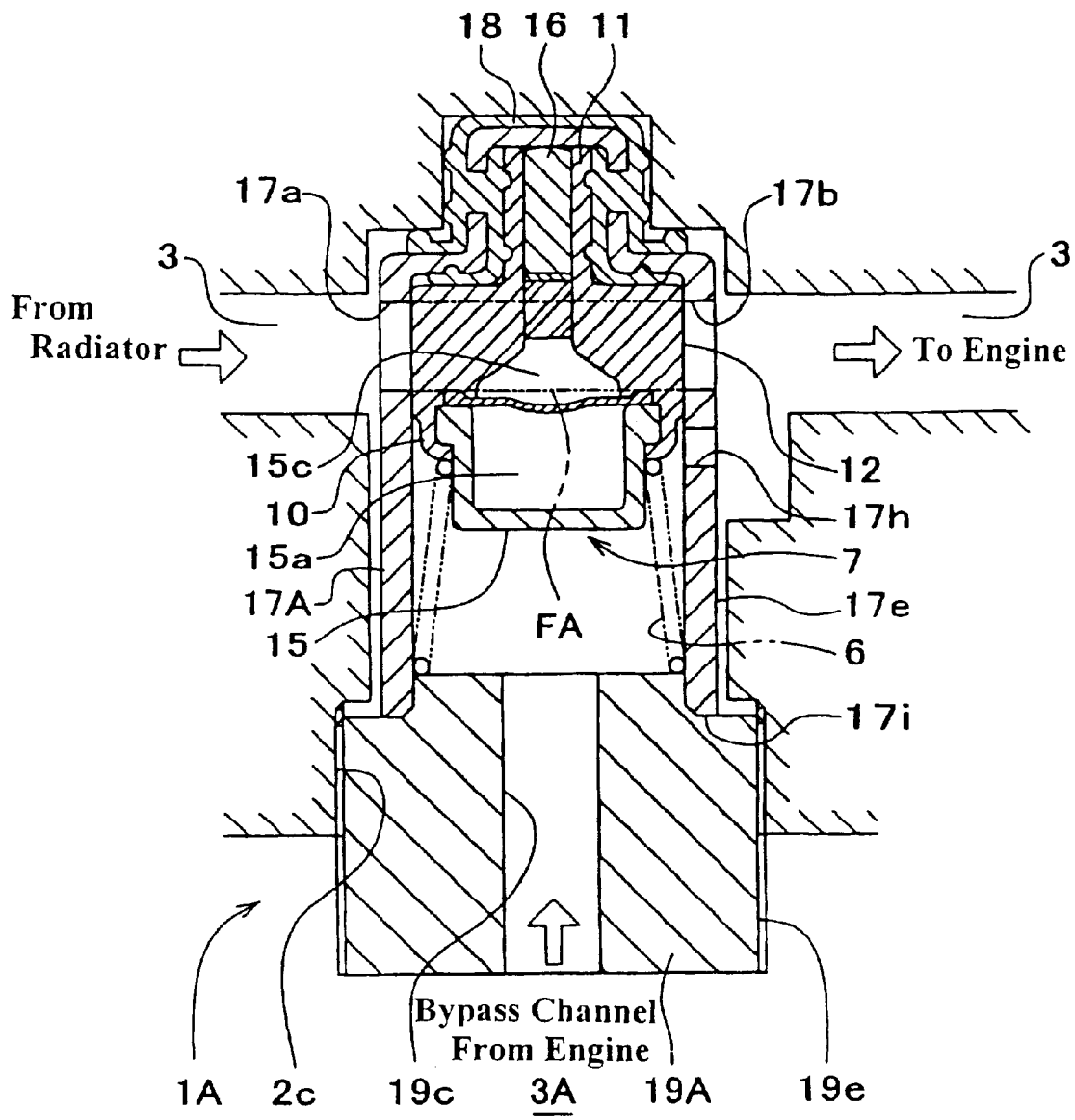

PRIOR ART FIG 8
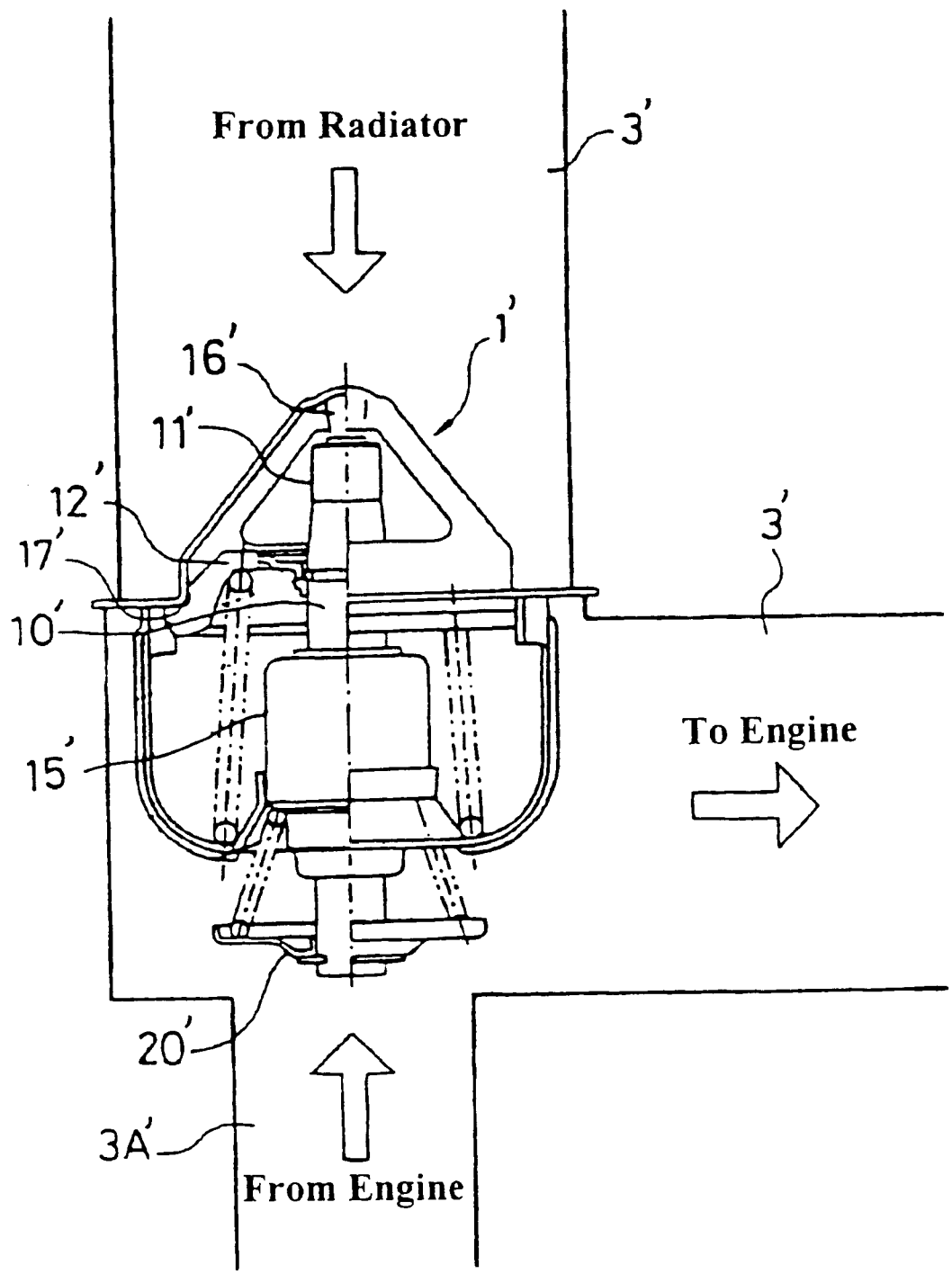

FITTING CONSTRUCTION OF THE THERMOSTAT

FIELD OF THE INVENTION

The present invention relates to a fitting construction of the thermostat, which is fit to an internal combustion engine and which controls the flow of a cooling fluid by blocking or communicating a cooling fluid channel.

BACKGROUND OF ART

At present, as commercially available cooling systems for engines, most of the systems are types which cool the engines by water-cooling. The water-cooled system prevents overheating due to the heating of the engine and prevents overcooling of the engine in cold times, always keeping the engine at an optimal temperature.

In the cooling system by water-cooling, a radiator is placed outside of an engine, and the radiator and the engine are connected by means of a rubber hose, etc. to circulate a cooling fluid. The main configuration of the water-cooled system is composed of the radiator, which plays a role as a heat exchanger, a water pump, which forcedly feeds the cooling fluid from the engine to the radiator, a thermostat, which controls the flow of the cooling fluid to or from the radiator depending upon a change in the temperature of the cooling fluid to keep the temperature of the cooling fluid at an optimal level, and a rubber hose, which forms a circulation channel for the cooling fluid, and the like. Such a water-cooled system for cooling an engine is utilized in an engine for a two-wheeled vehicle as well as an engine for four-wheeled vehicle.

The conventional fitting construction of the thermostat placed within the water-cooled internal combustion engine will now be described by referring to FIGS. 7 and 8. FIG. 7 is an explanatory view showing the condition where the conventional thermostat is fit to a general water-cooled internal combustion engine, and FIG. 8 is an elongated view of the portion where the thermostat is fit in FIG. 7.

As shown in FIG. 7, a thermostat 1', in the state of being accommodated within a case or such, is placed in an appropriate portion of a cooling fluid channel 3' formed between an engine E and a radiator R. As shown in FIG. 8, to the thermostat 1' is fit a piston 16' which moves forward and backward by means of an element 10' so that the direction of the movement of the piston 16' is parallel to the fluid channel of the cooling fluid (see the arrow in FIG. 8). By the movement of the piston 16', a valve element 12' and a valve seat 17' are separated from or brought into contact with each other to block or communicate the cooling fluid channel. In FIG. 8, number 11' is a guide portion which guides the movement of the piston 16', number 15' is a wax case in which a wax is stored, and number 20' is a second valve element which blocks or communicates a bypass channel 3A'. In FIG. 7, symbol P is a water pump.

As shown in FIG. 7(a), the thermostat 1' closes the cooling fluid channel 3' during the course from starting the engine E up to increasing the temperature within the engine E to an optimal temperature. To be specific, since the cooling fluid from the engine E does not flow toward the radiator R and does pass through the bypass channel 3A' to circulate within the engine E (see the arrow in FIG. 7(a)), the temperature of the cooling fluid will be soon increased to the optimal temperature. On the other hand, after the temperature reaches the optimal level, the valve element 12' of the thermostat 1' is opened to open the cooling fluid channel 3' at the side of the radiator R. At this time, since the cooling fluid passes through the radiator R and circulates within the engine E (see the arrow in FIG. 7 (b)), the interior of the engine E is allowed to cool down to keep the temperature at the optimal level.

In the conventional thermostat 1' to be placed in the internal combustion engine, the pipe diameter of the cooling fluid channel 3' for placing the thermostat 1' must be large in order to maintain the flow amount of the cooling fluid to the cooling fluid channel 3'. However, in the case of utilizing the cooling fluid channel 3' having a large diameter, the requirement of making an effective layout cannot be attained.

Moreover, the design of the pipe diameter is restricted in many ways, and a channel having a large diameter is difficult to be manufactured; thus, the place for fitting the thermostat is restricted in many ways.

Even if an appropriate pipe diameter is designed and the channel is manufactured, it is very difficult to place the thermostat within the pipe at an appropriate position, and its workability may be very poor.

SUMMARY OF THE INVENTION

An object of the present invention is to solve the above problems and to provide a fitting construction of the thermostat which moderates the restrictions concerning the fitting of the thermostat, and which can improve the workability of the installation.

The present invention which can attain the above object is a fitting construction of the thermostat, said thermostat possessing an inlet opening and an outlet opening formed on the circumference of the thermostat, a cylindrical valve body fixed onto a position where said inlet opening and said outlet opening communicate a cooling fluid channel of an internal combustion engine, a fluid channel area which communicates said inlet opening with said outlet opening within a cooling fluid channel of the internal combustion engine; and a valve element which actuates forward and backward by the function of a piston portion and a spring portion depending upon a temperature change in the cooling fluid to cross said fluid channel, and which blocks or communicates said fluid channel by the forward or backward movement, said construction possessing:

an insert hole which is formed across said cooling fluid channel, and into which said valve body is inserted, an alignment groove which is formed on the inner wall of the insert hole from the side of the hole opening of said insert hole along the direction of inserting said valve body, said valve body possessing a projection, which is placed on the circumference surface of the valve body, which is engaged with said alignment groove, and which can slide along said alignment groove, and a cover which is screwed from said hole opening onto said insert hole, and which pushes and supports said valve body at the end thereof.

By having such a construction, there is no need for enlarging the diameter of the pipe, making it possible to moderate the restrictions of the thermostat placement. The engagement of the alignment groove with the projection makes it easy to carry out alignment, leading to the improvement in the workability of fitting the thermostat.

BRIEF DESCRIPTION OF THE DRAWINGS

FIG. 6 is a longitudinal cross sectional view showing the situation where a thermostat according to a second embodiment of the present invention is placed within an internal combustion engine, and illustrating that the thermostat blocks a fluid channel area.

FIG. 8 is an elongated view of the portion where the thermostat is fit in FIG. 7.

BEST MODES FOR CARRYING OUT THE INVENTION

Figure 1:
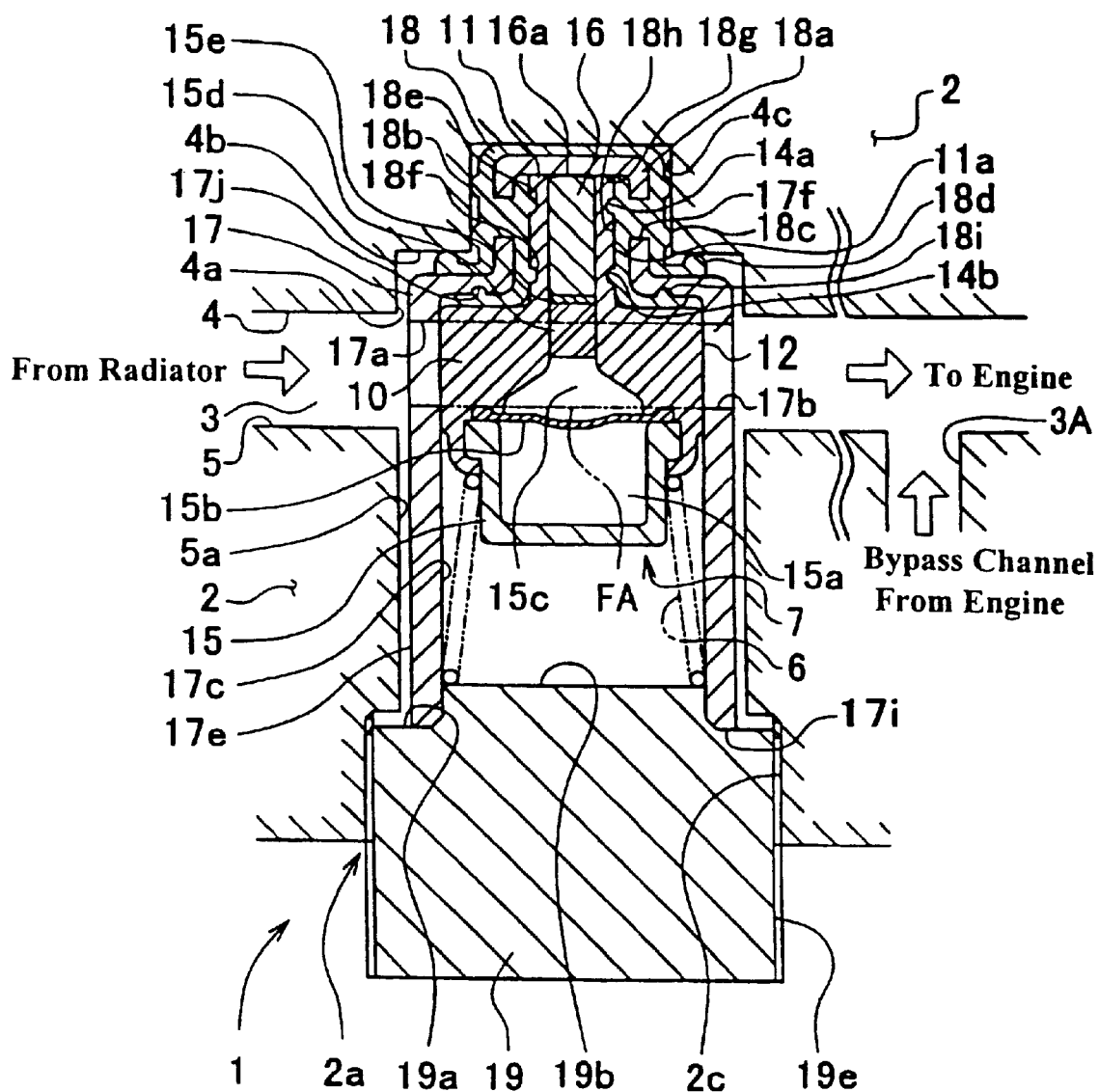
FIG. 1 is a longitudinal cross sectional view showing the situation where a thermostat according to a first embodiment of the present invention is placed within an internal combustion engine, and illustrating that the thermostat blocks a fluid channel area.

The present invention will now be described by referring to the drawings. The thermostat according to the first embodiment is an embedded type thermostat which is applied to a cooling fluid channel of an engine head. However, the placement position of the thermostat of this embodiment should not be restricted to the engine head, and the thermostat may be placed within any place of the cooling fluid channel, for example, an engine block, an interior of the radiator, or a branched portion of the bypass channel.

Figure 2:
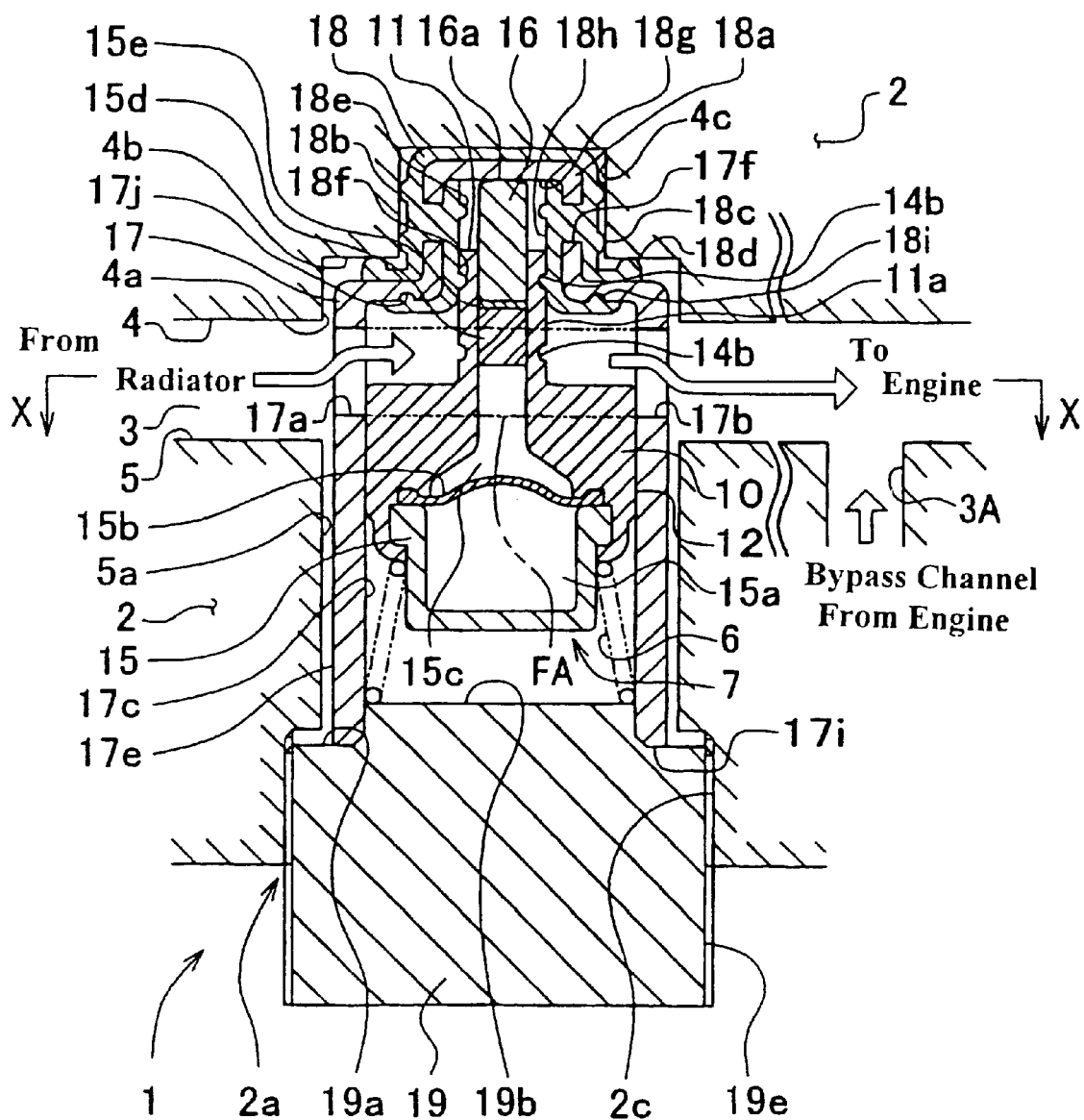
FIG. 2 is a longitudinal cross sectional view showing the situation where the thermostat according to a first embodiment of the present invention is placed within an internal combustion engine, and illustrating that the thermostat communicates a fluid channel area.
Figure 3:
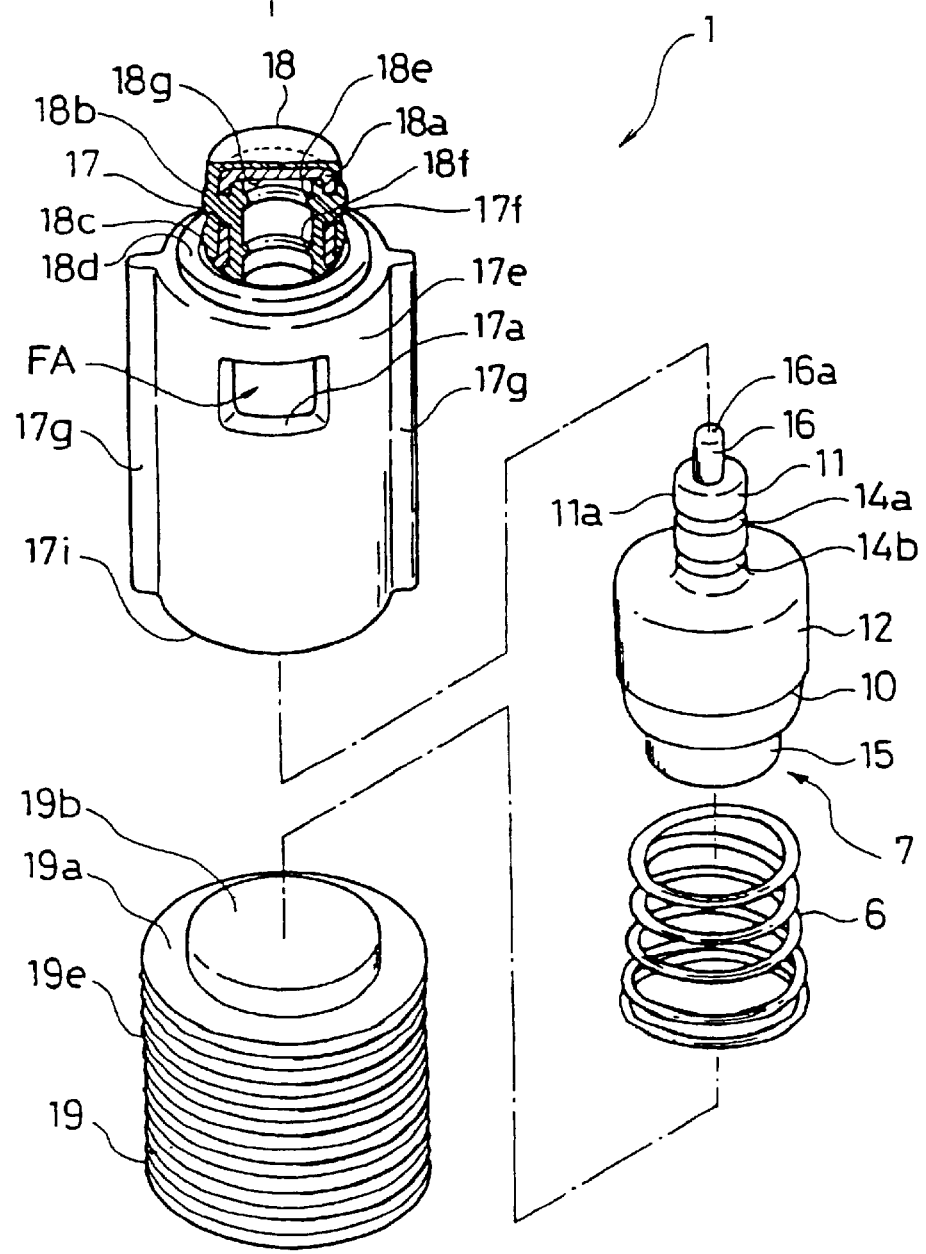
FIG. 3 is an exploded perspective view of the thermostat according to a first embodiment of the present invention.
Figure 4:
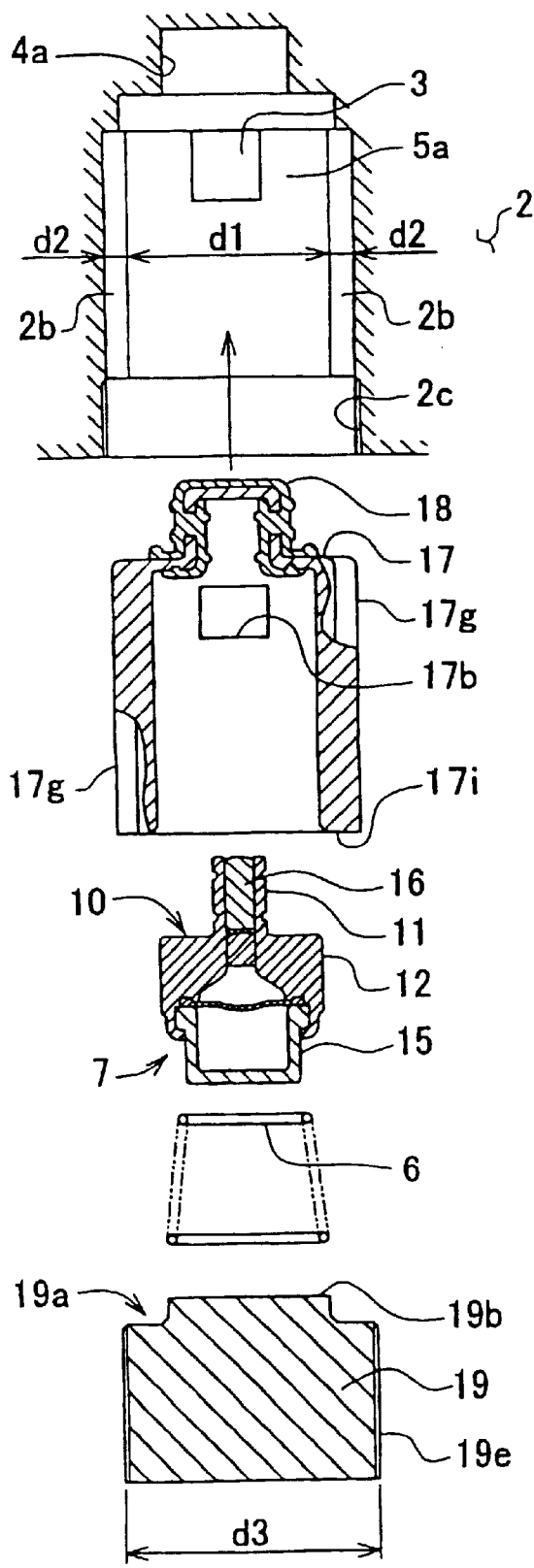
FIG. 4 is an exploded longitudinal cross sectional view of the thermostat according to a first embodiment of the present invention.

FIGS. 1 and 2 are longitudinal cross sectional views each showing the situation where the embedded type thermostat according to the first embodiment is placed within an internal combustion engine. FIG. 1 illustrates the state where the embedded type thermostat blocks a fluid channel area, and FIG. 2 illustrates the state where the embedded type thermostat communicates a fluid channel area. FIGS. 3 and 4 are exploded views of the embedded type thermostat according to the first embodiment. FIG. 3 is a perspective view and FIG. 4 is a longitudinal cross sectional view. In FIGS. 3 and 4, an embedded type thermostat 1 is viewed from the side of the radiator, and an upper portion of the embedded type thermostat 1 shown in an exploded manner, a lower insert hole 5a into which the embedded type thermostat 1 is embedded, and other parts are illustrated.

The embedded type thermostat 1 is embedded into an insert hole formed across a cooling fluid channel 3 of an engine head 2. The insert holes are made up of an upper insert hole 4a, positioned at an upper surface 4 of the cooling fluid channel 3 and the lower insert hole 5a, positioned at a lower surface 5 of the cooling fluid channel 3. The embedded type thermostat 1 thus placed controls the flow amount of the cooling fluid within the cooling fluid channel 3 depending upon a temperature change of the cooling fluid flowing through the cooling fluid channel 3.

The embedded type thermostat 1 is mainly composed of a hollow and cylindrical valve body 17, and a thermo-valve 7 which is stored in the hollow portion of the valve body 17. On the circumference surface 17e of the valve body 17, an inlet opening 17a and an outlet opening 17b are placed opposite each other, and an area communicating the inlet opening 17a with the outlet opening 17b is a fluid channel area FA, which is a fluid channel for the cooling fluid. To be specific, when the area of the inlet opening 17a and the area of the outlet opening 17b correspond to the cross sectional area of the cooling fluid channel 3, the flow amount of the cooling fluid is secured.

On the other hand, a thermo valve 7 slides within the valve body 17 due to the functions of a piston portion and a spring portion. In the case where the thermo valve 7 progresses as shown in FIG. 1 (in the state of the thermo valve 7 residing on an upper portion of the valve body 17 in this embodiment), the outer circumference 12 of an element 10 closes the inlet opening 17a and the outlet opening 17b to block the fluid channel area FA. On the other hand, in the case where the thermo valve 7 retracts as shown in FIG. 2 (in the state of the thermo valve 7 residing on a lower portion of the valve body 17 in this embodiment), the interference due to the outer circumference 12 of the element 10 is released to communicate the fluid channel area FA. To be specific, in this embodiment, the thermo valve 7 moves forwards and backwards crossing the fluid channel area FA to block and communicate the fluid channel area FA. Parts making up the embedded type thermostat 1 will now be described.

[Valve Body 17]

The valve body 17 is composed of a hollow cylindrical member having a major diameter so as to be able to be inserted into the upper insert hole 4a and the lower insert hole 5a. While the upper and lower ends of the valve body 17 are opened, the upper end is tightened to form an outer circumference 17f of the end of the valve body 17 to which a cap member 18 is fixed (see FIGS. 1 to 3). An inlet opening 17a and an outlet opening 17b are formed through the circumference surface 17e of the valve body 17. When the element 10 stored into the valve body 17 descends in a slidable manner and opens the inlet opening 17a and the outlet opening 17b to communicate the fluid channel area FA, the cooling fluid within the cooling fluid channel 3 flows from the radiator side to the engine side.

The outer circumference 17f of the end of the valve body 17 to be inserted into the upper insert hole 4b at the side of the upper surface 4 is formed so as to engage with the shape of a stepped surface of the upper insert hole 4a, and a cap member 18, which will be described later on, is fixed, for example, by means of baking.

In determining the material of the valve body 17, the environment to be installed, i.e., the thermal conductivity from the engine head 2 and mechanical processability, should be taken into consideration, and any material can be used as long as it adapts to such conditions.

The valve body 17 is inserted into the lower insert hole 5a formed on the engine head 2 as shown in FIG. 3. Two opposite alignment grooves 2b and 2b are formed on the lower insert hole 5a along the insert direction from the opening 2a to the valve body 17. On the other hand, projections 17g and 17g are formed on the circumference surface 17e of the valve body 17 along the shaft of the valve body 17. These projections 17g and 17g are formed into a shape corresponding to the alignment grooves 2b and 2b so that the projections 17g and 17g are engaged with and slide in the alignment grooves 2b and 2b.

[Thermo Valve 7]

The thermo valve 7 is inserted into the valve body 17, and as shown in FIGS. 1 to 3, the thermo valve 7 is mainly composed of a wax case 15 for storing a wax 15a serving as a thermal expansion element, a diaphragm 15b which transmits the expansion or shrinkage of the wax 15a to a semi-fluid 15c of an upper layer, the semi-fluid 15c which transmits the follow-up movement of the diaphragm 15b to a rubber piston 15d of an upper layer, the rubber piston 15d, a backup plate 15e which transmits the follow-up movement of the semi-fluid to the piston 16 of an upper layer, the piston 16, which pushes a metal fitting 18a of the cap member 18, and the element 10 which accumulates these configuration parts in a layered state.

Outer circumference 12 which can slide in the inner wall 17c of the valve body 17 is formed on the element 10. The outer circumference 12 slides along the inner wall surface 17c of the valve body 17, resulting in opening or closing the inlet opening 17a and the outlet opening 17b. Consequently, the outer circumference 12 corresponds to a valve element which communicates or blocks the fluid channel area FA.

The wax case 15 for storing the wax 15a is fixed at the bottom of the element 10, for example, by means of calking. On the other hand, at the upper side opposite the bottom side, the guide portion 11 serving as a guide for the piston 16 is formed. An outer circumference 11a of the guide portion 11 is formed into a shape corresponding to the shape of an inner wall surface 18h of the cap member 18 and slides in the inner wall surface 18h. To be specific, in this embodiment, the guide portion 11 of the element 10, the piston 16, the wax case 15, the wax 15a, and the like have the function of the piston portion as a whole.

A plurality of circular grooves 14a and 14b are caved onto the outer circumference 11a of the guide portion 11 along the circumference surface. The circular grooves 14a and 14b engage with a plurality of lip portions 18e and 18f projecting on the inner wall surface 18h of the cap member 18, resulting in the cap member 18 becoming held in a much more secure manner. The engagement also prevents the penetration of the cooling fluid into the gap formed between the guide portion 11 and the piston 16. Furthermore, since the cap member 18 holds the outer circumference 11a of the guide portion 11, it becomes possible to prevent from the slanting of the guide portion 11 which moves according to the movement of the piston 16.

[Cap Member 18]

The cap member 18 is in a hat form and is formed so that the outside portion of the head portion of the cap member 18 is inserted into an insert hole 4c at the head portion provided on the center of the upper insert hole 4a (see FIG. 1 or 2). In the cap member 18, the rubber surrounds a metal fitting 16a, for example, by baking, and is fixed onto the end outer circumference 17f of the end of the valve body 17 (see FIGS. 1 to 3). A groove portion 17j and a lip portion 18i which are engaged with each other are formed respectively on the contact surface between the valve body 17 and the cap member 18, which are unified and fixed, for example, by baking. They prevent the penetration of the cooling fluid and dust.

Onto a brim portion of the cap member 18 and the outer circumference of the cap member 18, lip portions 18b, 18c, and 18d projecting into a circular form are provided, and the lip portions 18b, 18c, and 18d slide in contact with the upper insert hole 4a and the insert hole 4c at the head portion to prevent the penetration of the cooling fluid, etc.

On the other hand, lip portions 18e and 18f projecting into a circular from are provided on the inner wall surface 18h of the cap member 18 and they are engaged with the circular grooves 14a and 14b formed on the guide portion 11. Consequently, the engagement of the circular grooves 14a and 14b with the lip portions 18e and 18f prevents the penetration of the cooling fluid into the gap formed between the guide portion 11 and the piston 16 and prevents the slanting of the element 10 when it slides, which makes it possible to exhibit stable actuation.

The temperature of the cooling fluid within the cooling fluid channel 3 is transmitted from the outer circumference 12 of the element 10 to the wax 15a via the wax case 15. Due to such transmission of the temperature, the wax 15a expands or shrinks to cause the piston 16 to go forward or backward. However, actually, since the contact portion 16a, which is an end of the piston 16, is always in contact with the contact surface 18g of the metal fitting 18a of the cap member 18, and since the metal fitting 18a is fixed within the upper insert hole 4a, the element 10 is relatively pushed up.

[Coil Spring 6]

The coil spring 6 serving as a spring member for the thermo valve 7 makes up the spring portion in this embodiment. The coil spring 6 is inserted into a gap between the cover 19 and the thermo valve 7. The coil spring 6 has the function of always applying a resilient force to the thermo valve 7 in an upward direction (see FIGS. 1 to 3).

Changing the total height of the coil spring 6 makes it possible to apply changes in the conditions, such as the set actuation temperature of the thermostat 1, the flow amount, etc.

[Cover 19]

A male screw portion 19e is formed on the outer circumference of the cover 19. On the other hand, at the side of the opening 2a of the lower insert hole 5a, a female screw portion 2c corresponding to the male screw portion 19e is formed. Consequently, due to the screwing of the male screw portion 19e and the female screw portion 2c, the cap 19 is fixed. An edge surface 19a of the cover 19 to be inserted into the interior of the lower insert hole 5a is in contact with valve body 17. Consequently, when the cover 19 is screwed, the edge surface 19a pushes a bottom surface 17i of the valve body 17 to thereby support the valve body 17 between the upper insert hole 4a and the stepped wall surface 4b.

Furthermore, a projecting surface 19b is formed at the center of the edge surface 19a. The diameter of the projecting surface 19b corresponds to the inner diameter of the valve body 17 so that the valve body 17 can be inserted into the projecting surface 19b. The projecting surface 19b has the function of supporting the coil spring 6 (see FIGS. 1 to 4).

As shown in FIG. 4, the diameter (d3) of the cap 19 is formed so as to be longer than the total of the diameter (d1) of the lower insert hole 5a and the groove depth (2×d2) of the alignment grooves 2b and 2b, i.e., (d1+2×d2). This prevents the leakage of the cooling fluid from the gap formed between the valve body 17 and the lower insert hole 5a.

Next, the fitting construction of the embedded type thermostat 1 and specific method for fitting the same will be described.

As described above, the upper insert hole 4a, the lower insert hole 5a, the alignment grooves 2a, and the like are formed on the engine head 2. First, the valve body 17 is inserted into the lower insert hole 5a. In the course of the insertion, it is required to align the position so as to communicate the inlet opening 17a and the outlet opening 17*b* with the cooling fluid channel 3 (see FIGS. 1 and 2). In this alignment, if the projections 17*g* and 17*g* formed on the circumference surface 17*e* of the valve body 17 are inserted into the alignment grooves 2*b* and 2*b* formed on the lower insert hole 5*b*, the alignment can be inevitably carried out. Consequently, even if the valve body 17 is pushed into the interior, no deviation occurs, making it possible to carry out accurate alignment, which then improves the workability of fitting the embedded type thermostat 1. Since the projections 17*g* and 17*g* and the alignment grooves 2*a* and 2*a* are fastened to each other due to the insertion, the rotation of the valve body 17 is also regulated.

The cover 19 is screwed to the valve body 17 into which the thermo valve 7 and the coil spring 6 are accommodated. At this time, the edge surface 19*a* of the cover 19 is in contact with the bottom surface 17*i* of the valve body 17 to push the valve body 17. This causes the valve body 17 to move while the valve body 17 is guided by the alignment grooves 2*b* and 2*b*, reaching the position where the inlet opening 17*a* and the outlet opening 17*b* are communicated with the cooling fluid channel 3.

The functions of the embedded type thermostat 1 according to this embodiment will now be described (see FIGS. 1 and 2).

[Functions of Embedded Type Thermostat 1 from Closed State to Opened State]

The cooling fluid within the cooling fluid channel 3 before warming up has a low temperature. This temperature is transmitted to the wax 15*a* within the wax case 15 via the outer circumference 12 of the element 10 and via the wax case 15 (see FIG. 1).

The temperature of the cooling fluid is increased with the elapse of time, and the wax 15*a* within the wax case 15 swells to increase its volume. Due to the increase in the volume of the wax 1 5*a*, the diaphragm 15*b* swells upward. This gives the force of pushing the rubber piston 15*d* upward via the upper semi-fluid 15*c*. This force is transmitted to the piston 16 via the backup plate 15*e*, whereby the piston 16 will project out of the guide portion 11. However, since the contact portion 16*a* which is the edge of the piston 16 is always in contact with the contact surface 18 of the metal fitting 18*a* of the cap member 18, which has been fixed, the element 10 itself is pushed down due to the relative movement to the piston 16 (see FIG. 2).

At this time, the circular groove 14*a* of the guide portion 11 engaged with the lip portion 18*e* of the cap member 18 descends along the inner wall surface 18*h* of the cap member 18 and is finally engaged with the lip portion 18*f* of the cap member 18.

The position of the lip portion 18*f* formed by the projection is an approximate position for determining the final descending position of the element 10. On the way from the lip portion 18*e* to the lip portion 18*f*, another lip portion may be formed to enhance preventing the cooling fluid from penetrating into the gap portion between the guide portion 11 and the piston 16.

The coil spring 6 for the purpose of always applying the resilient force to the thermo valve 7 upwardly is placed on the gap between the thermo valve 7 and the cover 19 and, thus the thermo valve 7 descends in a slidable manner against the resilient force of the coil spring 6.

When the thermo valve 7 descends, the inlet opening 17*a* and the outlet opening 17*b* of the valve body 17, which have been in the closed state by means of the outer circumference 12 of the element 10, are opened to be communicated with the fluid channel area FA. As a result, the cooling fluid flows from the radiator side to the engine side as shown by the belt arrow of FIG. 2.

[Functions of Embedded Type Thermostat 1 from Opened State to Closed State]

When the engine is stopped, the actuation of the water pump is also stopped and the circulation of the cooling fluid within the cooling fluid channel 3 is stopped as well. The temperature of the cooling fluid within the cooling fluid channel 3 is decreased with the elapse of time. This temperature change is transmitted to the wax 15*a* within the wax case 15 via the outer circumference 12 of the element 10 and via the wax case 15, and the wax 15*a* which has been expanded is shrunken according to the decrease in the temperature. This causes the thermo valve 7 to slide upward by means of the resilient force of the coil spring 6 which always applies the upward resilient force to the thermo valve 7. As a result, the outer circumference 12 of the element 10 finally closes the inlet opening 17*a* and the outlet opening 17*b* of the valve body 17 to block the fluid channel area FA (see FIG. 1).

This is the function of controlling the cooling fluid channel 3 due to the embedded type thermostat 1.

In the embedded type thermostat 1 according to this embodiment, the projections 17*g* and 17*g* are formed in the state that they are arranged in a series from the lower end to the upper end. Also, assuming the circumference surface 17*e* of the valve body 17, on which the inlet opening 17*a* and the outlet opening 17*b* are formed, as front and back circumference surfaces 17*e* and 17*e*, the circumference surfaces 17*e* residing at the left and the right side, i.e., the left and right circumference surfaces 17*e* between which the fluid channel area FA is sandwiched have the projections 17*g* and 17*g* respectively formed thereon. The possession of the projections 17*g* and 17*g* in such a configuration exhibits another function in addition to and in connection to the functions described above. Such functions will now be described by referring to FIG. 5.

Figure 5:
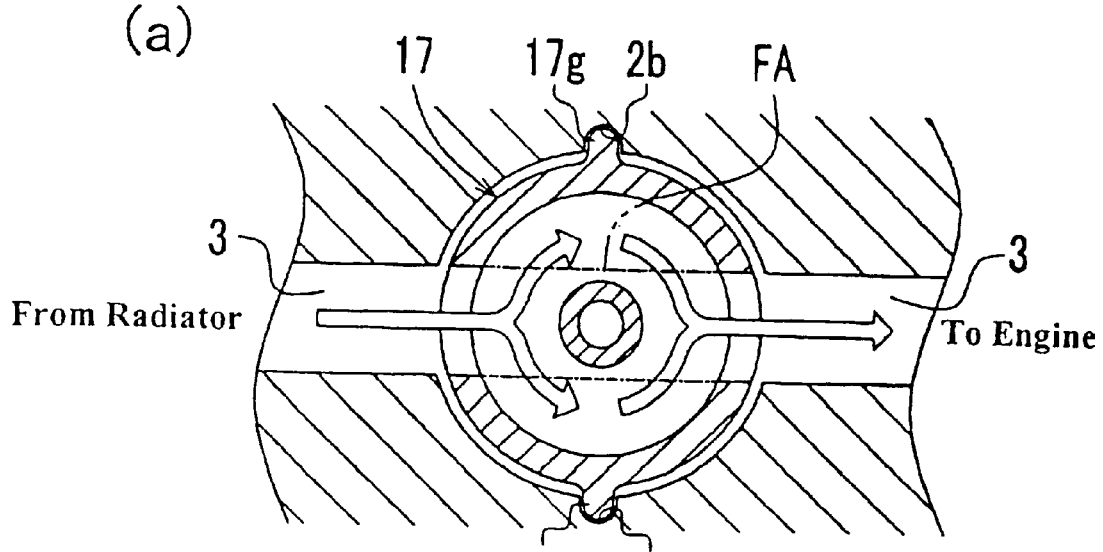
FIG. 5(a) is an X—X cross sectional view of the thermostat according to a first embodiment of the present invention.
FIGS. 5(b), and 5(c), are explanatory views each based on FIG. 5(a).
Figure 5:
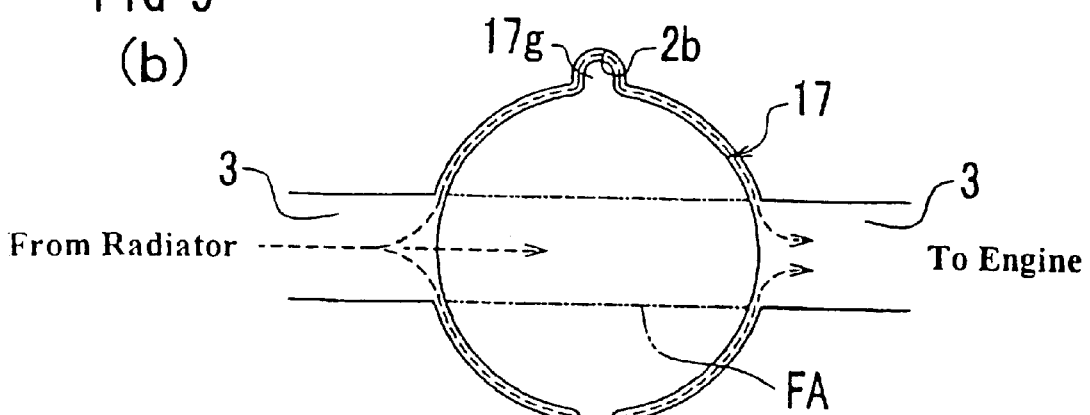
Figure 5:
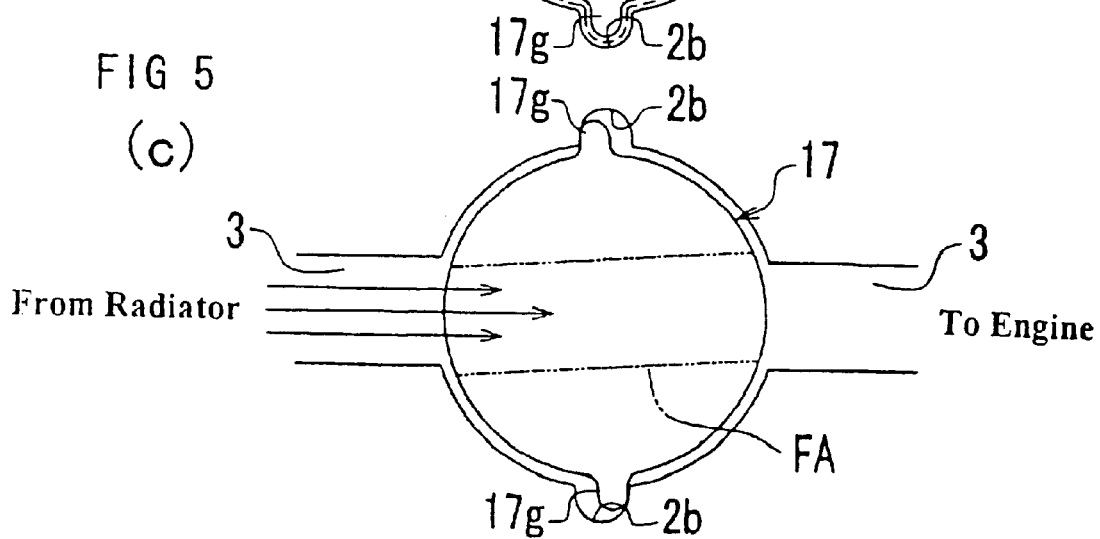
Figure 7A:
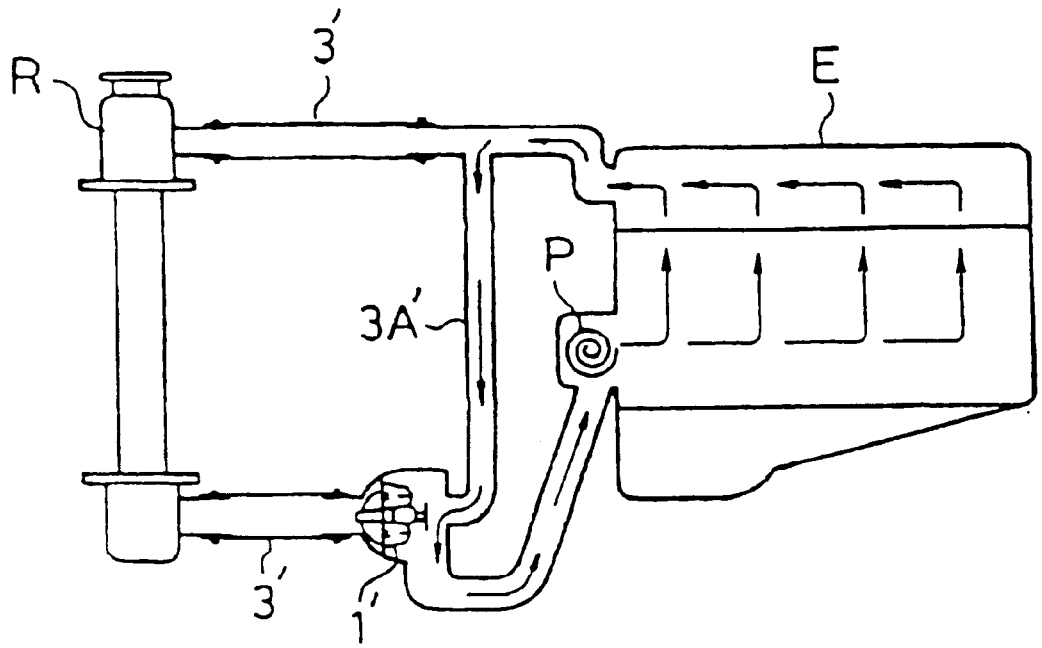
FIG. 7 is an explanatory view showing the condition where the conventional thermostat is fit to a general water-cooled internal combustion engine.
Figure 7B:
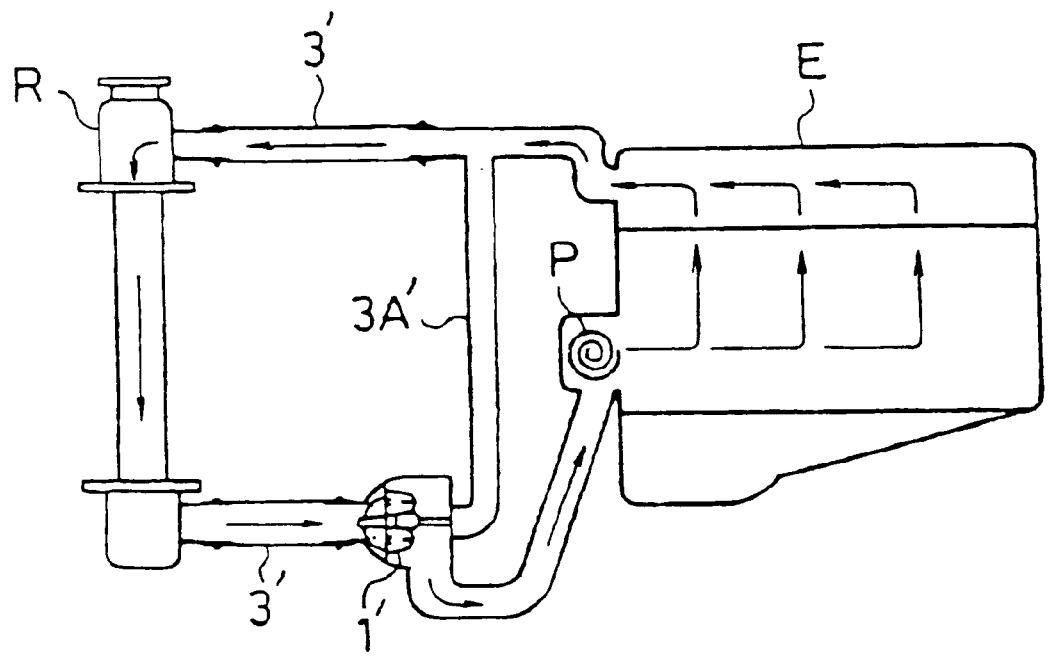

FIG. 5 (*a*) is an X—X cross sectional view of FIG. 2 and FIGS. 5 (*b*) and 5 (*c*) are explanatory views for explaining the functions of the embedded type thermostat of the present invention and are based on FIG. 1. In the state shown in FIG. 5, the fluid channel area is in the communicated state, and the cooling fluid flows as shown by the band arrow.

First, when the valve body 17 is inserted into the lower insert hole 5*a*, a slight gap occurs between the alignment grooves 2*b* and 2*b* formed on the lower insert hole 5*a* and the projections 17*g* and 17*g* formed on the valve body 17. In this state, as shown by the dot arrow in FIG. 5 (*b*), the cooling fluid runs through the gap thus formed. However, in the actual fitting, since the cover 19 fastens the valve body 17 by screwing (see FIGS. 1 and 2), a moment occurs on the bottom 17*i* of the valve body 17 in the spiral direction (rotation direction). As a result, the valve body 17 rotates and is fixed in the state where the projections 17*g* and 17*g* are in contact with the alignment grooves 2*b* and 2*b* in a face-to-face manner. This blocks the gap and prevents the cooling liquid from flowing through the gap.

By having such a construction, the thermostat 1 of the present invention can reduce the disadvantage that the cooling fluid at the radiator side leaks into the engine side, making it possible to warm up of the engine in a quick manner.

Subsequently, the embedded type thermostat according to another embodiment (the second embodiment) of the present invention will now be described by referring to FIG. 6. FIG. 6 is a longitudinal cross sectional view showing the situation where a thermostat according to a second embodiment of the present invention is placed within an internal combustion engine.

In this embodiment, the basic construction of the embedded type thermostat 1A is similar to that of the embedded type thermostat 1 according to the first embodiment. Consequently, with regard to the parts having the same configurations and the same functions used in this embodiment, the same symbols are used, and the detailed explanations thereof will be omitted.

In the embedded type thermostat 1A shown in FIG. 6, a through hole 19c is formed in the cover 19A, and the through hole 19c communicates a bypass channel 3A with the interior of the valve body 17A. Since the valve body 17A has a hollow shape, the cooling fluid flows within the interior of the valve body 17A. On the circumference surface 17e, an inlet opening 17a, an outlet opening 17b as well as a bypass opening 17h are formed. The bypass opening 17h is communicated with the cooling fluid channel 3 at the side of the outlet opening 17b, and while the thermo valve 7 blocks the fluid channel area FA, the bypass opening 17h is opened. On the other hand, when the thermo valve 7 is pushed up to communicate the fluid channel area FA, the outer circumference 12 of the element 10 closes the bypass opening 17f. By fitting the embedded type thermostat 1A according to this embodiment, a much more effective layout in the engine room can be attained.

As described above, according to the present invention, for example, there is no need for using a pipe having a big diameter in the cooling fluid channel, thereby reducing the restrictions of the arrangement of the thermostat.

Also, the alignment becomes easy due to insertion of the projection into the alignment groove, which enhances the workability in the fitting of the thermostat.

What is claimed is:

1. A fitting construction for a thermostat having an inlet opening and an outlet opening, a valve body fixed onto a position where said inlet opening and said outlet opening communicate a cooling fluid in a cooling fluid channel depending upon a temperature change in the cooling fluid and a plurality of projections provided on an outer surface of the valve body and extending in a longitudinal direction of the valve body, said fitting construction comprising:

an insert hole formed across said cooling fluid channel to divide said cooling fluid channel into upstream and downstream channels with respect to the insert hole, the insert hole being configured to accommodate said valve body to form a gap between the outer surface of the valve body and the inner wall of the insert hole, the gap connecting the upstream channel and the downstream channel, said insert hole having an inner wall extending across the cooling fluid channel and a hole opening from which said valve body is inserted;

a cover configured to be screwed to close said hole opening and support said valve body at an end portion thereof; and a plurality of alignment grooves formed on the inner wall of the insert hole, said valve body being configured to be rotated when the cover is screwed to close said hole opening, each of the plurality of projections on the valve body being configured to contact each of the plurality of alignment grooves to block the gap when the cover is screwed to close said hole opening thereby preventing the cooling liquid from flowing from the upstream channel to the downstream channel through the gap.

2. The fitting construction of claim 1, wherein said cover is configured to be screwed into said insert hole.

3. An internal combustion engine comprising the fitting construction of claim 1.

4. A vehicle comprising the fitting construction of claim 1.

5. A cooling system comprising the fitting construction of claim 1.

6. A method for fitting a thermostat into a cooling fluid channel, the thermostat having an inlet opening and an outlet opening, a valve body provided onto a position where said inlet opening and said outlet opening communicate a cooling fluid depending upon a temperature change in the cooling fluid, and a plurality of projections provided on an outer surface of the valve body and extending in a longitudinal direction of the valve body, said method comprising:

forming an insert hole across the cooling fluid channel to divide the cooling fluid channel into upstream and downstream channels with respect to the insert hole, the insert hole having a hole opening and an inner wall extending across the cooling fluid channel;

forming a plurality of alignment grooves each configured to slidably engage with a respective one of the plurality of projections on the valve body;

providing a cover configured to close the hole opening and support the thermostat at an end portion of the thermostat;

inserting the thermostat into the insert hole from the hole opening such that the projection on the valve body is inserted into the alignment groove and such that a gap which connects the upstream channel and the downstream channel is formed between the outer surface of the valve body and the inner wall of the insert hole; and closing the hole opening by rotating the cover together with the valve body such that each of the plurality of projections on the valve body contacts each of the plurality of alignment grooves to block the gap thereby preventing the cooling liquid from flowing from the upstream channel to the downstream channel through the gap.

7. The method for fitting a thermostat into a cooling fluid channel of claim 6, wherein:

said over is configured to be screwed into the insert hole; and said closing step comprises screwing the cover into the insert hole.

* * * * *